Feb. 6, 1923.

E. BOYCE

RIM AND TIRE

Filed June 14, 1921

Inventor
Edwin Boyce
By H. B. Willson Yes
Attorneys

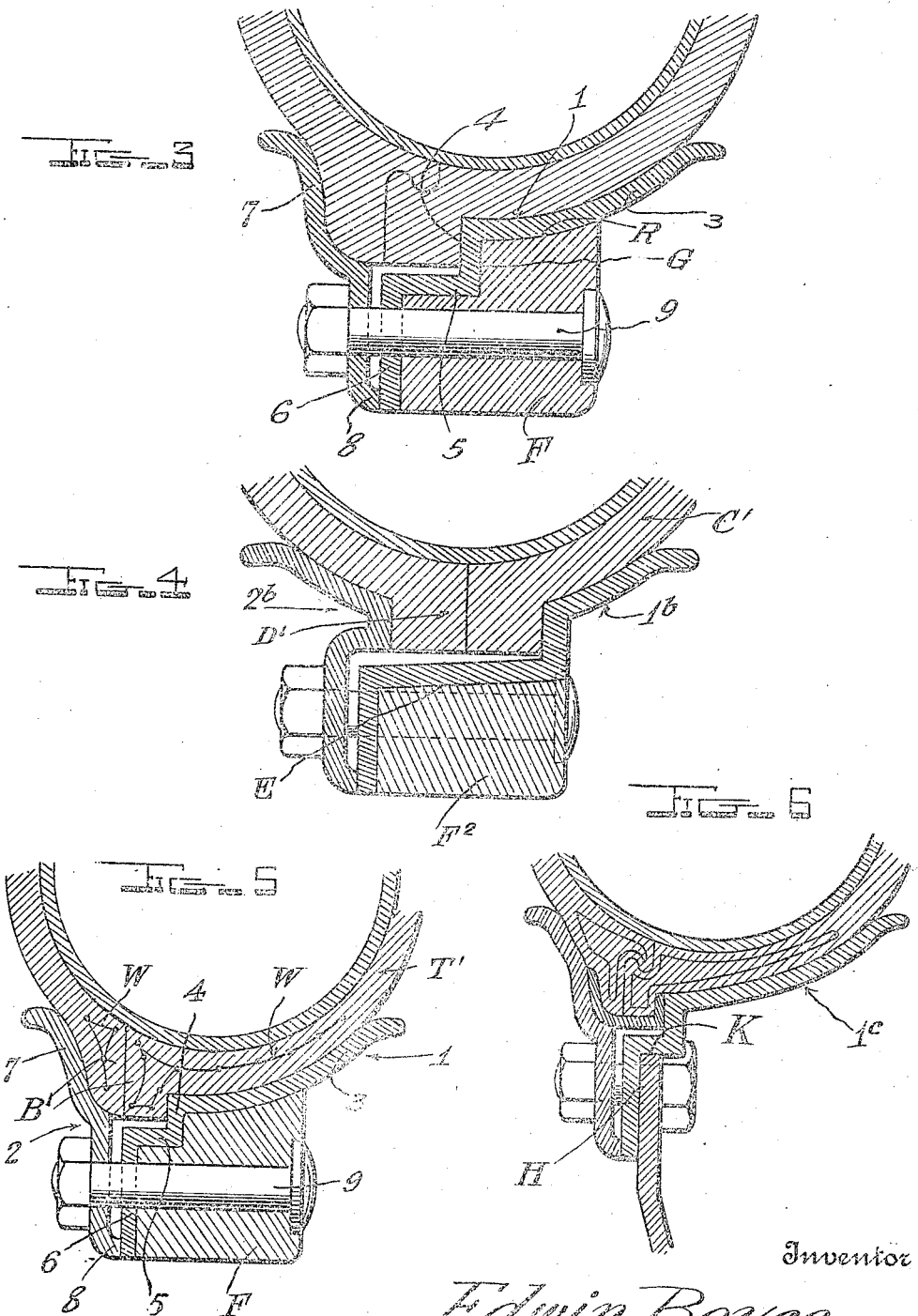

Patented Feb. 6, 1923.

1,444,653

UNITED STATES PATENT OFFICE.

EDWIN BOYCE, OF PINE BLUFF, ARKANSAS.

RIM AND TIRE.

Application filed June 14, 1921. Serial No. 477,509.

*To all whom it may concern:*

Be it known that I, EDWIN BOYCE, a citizen of the United States, residing at Pine Bluff, in the county of Jefferson and State of Arkansas, have invented certain new and useful Improvements in Rims and Tires; and I do declare the following to be a full, clear, and exact description of the invention, such as will enable others skilled in the art to which it appertains to make and use the same.

This invention relates to an improved sectional tire rim especially adapted for use on automobile wheels.

The principal object of the invention is to generally improve upon rims of this class by providing one of extreme simplicity and durability which is practical, inexpensive, and such in construction that it is capable of being applied on various kinds of wheels without requiring extensive alteration.

More specifically, it is an object of the invention to provide a tire rim having a channel for reception of a circumferential rib on a special type of pneumatic tire.

Other objects and advantages of the invention will be apparent during the course of the following description.

In the accompanying drawings forming a part of this specification and in which like numerals are employed to designate like parts throughout the same:

Figure 3 is substantially identical with Fig. 1, one of the details being omitted.

Figure 4 is a view like Fig. 2 wherein the rim is applied upon a common unaltered wheel felly.

Figure 5 is a view substantially the same as Figs. 1 and 3 showing a slightly modified form of tire.

Figure 6 is a detail section showing the invention applied upon a disk wheel.

Figure 1:
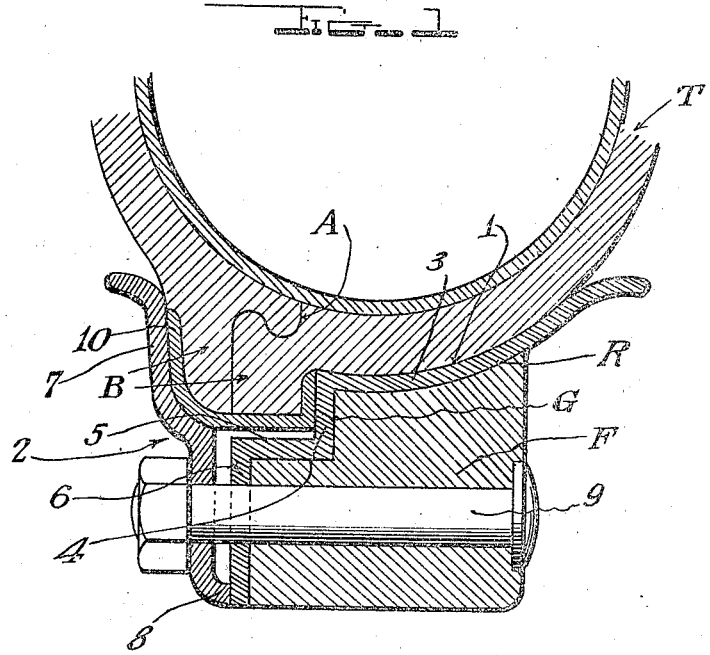
Figure 1 is a transverse sectional view through the felly of a wheel showing the improved rim thereon and disclosing the manner in which the special tire is associated therewith.

Broadly speaking, the rim shown in the several figures of the drawing is composed of a pair of ring-like sections, one of which is designed to rest against the felly of an automobile wheel so that a portion thereof extends beyond the felly, this section being formed with a circumferential angular shouldered portion between its edges and having one edge bent to provide a stop flange resting against one side of the wheel felly, the other rim section having one edge engaging this stop flange to space it away from the flange and shouldered portion to provide a channel for reception of an anchoring rib on the special tire used in connection with this rim.

It may be conveniently mentioned here that the form of rim disclosed in Figs. 1, 3 and 5 is identical and a description of Fig. 1 will suffice for the other two figures. Therefore, by confining attention to Fig. 1, it will be seen that the reference character 1 designates generally one of the ring-like rim sections while 2 refers to the complemental section. As shown, the first named rim section is adapted to rest upon the felly F of an automobile wheel. The portion 3 of this rim section 1 is curved transversely and is seated in a transversely curved recessed portion formed in the outer periphery of the aforesaid felly. The outer free edge of the portion 3 of the rim section is extended beyond the inner vertical face of the felly. The intermediate portion of the rim section is bent inwardly and then laterally outward as at 5 to provide what may be conveniently termed an angular shouldered portion which is intended to be received in a groove G in the wheel felly which is shaped to receive it. The edge or remaining portion of this rim section adjacent the shouldered part is directed laterally inward to provide a stop flange 6 and this flange is intended to rest against the inner vertical side of the wheel felly. The stop flange 6 is formed at circumferentially spaced points with openings which register with transverse holes formed in the wheel felly to permit passage of the retaining bolts 9. The second rim section 2 has its outer half shaped as at 7 to conform to a part of a tire against which it bears. The inner edge of the inner half of this rim section is directed laterally as at 8 and this edge bears against the stop flange to space the two rim sections apart to provide a channel between the central portion of the rim section 2 and the shouldered intermediate portion of the rim section 1 to accommodate the circumferential anchoring rib on the special pneumatic tire T. In the form of the invention now under consideration, the anchoring rib of the tire is disposed adjacent the inner vertical face of the wheel felly and the shouldered part of the rim section 1 is disposed in a position to accommodate the rib when it is at this point. Although it is not essential, an endless reinforcing member of channeled cross-section is fitted upon the anchoring rib of the tire and is clamped between the rim sections when the nuts on the aforesaid bolts are tightened. It may be stated here that the second named rim section 2 is also equipped with openings to accommodate the bolts. It may also be stated here that the two beads B of which the anchoring rib is composed are designed as at A to provide an interlocking connection between them. This construction guards against accidental separation of the beads.

Directing attention now to Fig. 3, it will be seen, as before stated, that this is substantially identical with the figure just described and the same reference characters used in Fig. 1 are also used here to designate like parts. The only difference between the two figures under consideration is that the supplemental reinforcing and retaining member 10 is omitted from Fig. 3. Attention may also be logically directed to Fig. 5 here since this figure is likewise identical with the two figures already referred to with the exception that the beads B' of the tire T' are reinforced by imbedding wire W or the like therein and the special interlocking connection between them is entirely eliminated. As there are no other differences, the same reference characters already used will also apply to this figure.

Figure 2:
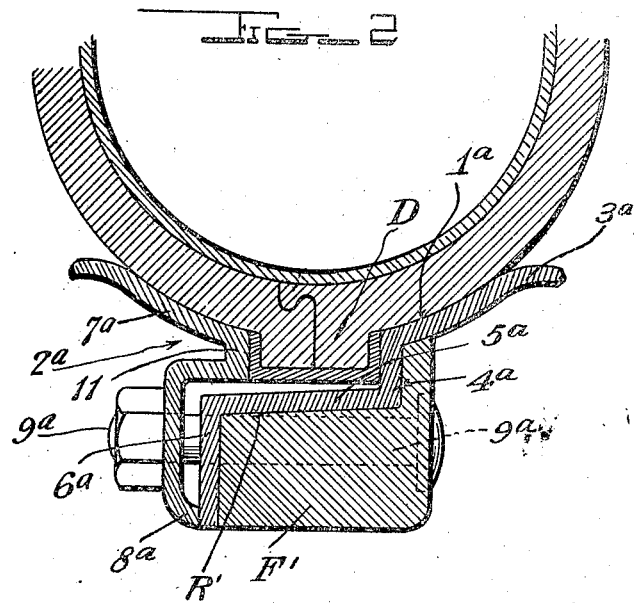
Figure 2 is a view like Fig. 1 showing the retaining rib of the tire positioned approximately at the center of the wheel felly, the rim being modified to accommodate this.

Coming now to Fig. 2, it will be seen that the reference character 1ª designates generally the inner rim section while 2ª designates the complemental outer rim section which coacts therewith. The portion 3ª of the rim section first mentioned is likewise slightly curved transversely and the free edge thereof projects a considerable distance beyond the inner vertical side of the wheel felly F'. The intermediate portion of this rim section is bent laterally inward as at 4ª and then laterally outward as at 5ª to provide an angular shouldered portion which is received in the comparatively large recess R' formed in the periphery of the aforesaid wheel felly F'. The opposite edge of the rim section under consideration is directed laterally inward as at 6ª to provide a stop flange which rests against the outer face of the felly of the wheel. The rim section 2ª has the portion 7ª shaped to contact the casing C of the special pneumatic tire, and has its inner edge 8ª directed laterally as shown to bear against the stop flange 6ª to space the two rim sections and to provide a channel between the aforesaid angular shouldered portion and the angularly bent central portion 11 of the rim section 2ª. As before described, this channel is intended to accommodate the centrally disposed anchoring rib B of the casing.

Closely related to that form of the invention just described is the form shown in Fig. 4. By directing attention to this figure it will be seen that the rim sections 1ᵇ and 2ᵇ are identical with the rim sections described in Fig. 2. Therefore, no further description of these details is thought necessary. The anchoring rib of the pneumatic tire however is composed of beads which are not connected by the especial joint and this rib is centrally disposed for reception in the centrally disposed channel provided between the tire rim sections. The felly F² of the wheel simply has its periphery beveled from edge to edge instead of being recessed as shown in the already described figure.

Directing attention finally to the other modified form of the invention disclosed in Fig. 6, it will be seen that the rim is designed for use in connection with a solid metal disk wheel H, against the peripheral portion K of which the shouldered portion of the rim section 1ᶜ rests. Inasmuch as the details of the rim and tire are identical with those shown in Figs. 1 and 3, no further description of this figure is deemed necessary.

From the foregoing description it is evident that I have evolved and produced a unique tire rim which is such as to enable it to be used on different kinds of wheels without requiring extensive alteration. Inasmuch as the rim is composed of easily separable sections, it will be seen that the tire can be easily and readily removed or applied. In practice, the shouldered ring like rim section may be secured to the wheel so as to permit it to remain in position while permitting the remaining rim section to be removed to permit removal of a damaged tire and substitution of a good tire.

By carefully considering the description in connection with the drawing, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

A tire rim comprising a pair of ring-like rim sections, one of which is designed to be secured to and rest against the wheel felly with one edge extending beyond the inner side of the felly, said one rim section being provided between its edges with a circumferentially extending angular shouldered portion and having its opposite edge directed laterally inward to provide a stop flange for engagement with the outer side of the aforesaid felly, the other ring-like rim section being spaced from said flange and having its inner peripheral edge directed laterally and bearing against the flange, the outer edge of the second rim section being extended beyond the felly and being spaced from the aforesaid shoulder to provide a channel for reception of the rib on a special tire, and bolts passing through said rim sections and felly to hold the rim on the latter and to tightly clamp the aforesaid rib between the rim sections.

In testimony whereof I have hereunto set my hand.

EDWIN BOYCE.

Witnesses:
P. E. STECK,
W. M. RYLAND.